April 6, 1937.  J. B. BROWN  2,076,117
CONTROL FOR THROTTLE, CLUTCH, AND BRAKE MEANS FOR AUTOMOBILES
Filed April 13, 1933  7 Sheets-Sheet 2

Fig. 2

INVENTOR
Jesse B Brown
BY Chappell & Earl
ATTORNEYS

April 6, 1937.  J. B. BROWN  2,076,117
CONTROL FOR THROTTLE, CLUTCH, AND BRAKE MEANS FOR AUTOMOBILES
Filed April 13, 1933  7 Sheets-Sheet 3

INVENTOR
Jesse B Brown
ATTORNEYS

Patented Apr. 6, 1937

2,076,117

UNITED STATES PATENT OFFICE 2,076,117

CONTROL FOR THROTTLE, CLUTCH, AND BRAKE MEANS FOR AUTOMOBILES

Jesse B. Brown, Detroit, Mich., assignor, by mesne assignments to John E. Martz, Detroit, Mich.

Application April 13, 1933, Serial No. 665,977

18 Claims. (Cl. 192—.01)

This invention relates to improvements in control means for the throttle, clutch and brake means of automobiles.

The main objects of the invention are:

First, to provide an effective semi-automatic power control means for the clutch and brake in association with the throttle or accelerator.

Second, to provide an improved power cylinder means for controlling both the clutch and brake means.

Third, to provide an improved construction of valve mechanism for controlling such a cylinder.

Fourth, to provide in such a construction improved means of shifting the control of the clutch from the foot pedal to power connection or vice versa, and at the same time utilize to the full the power means for operating the brakes.

Fifth, to provide in a power clutch structure effective means for shifting from power to regular control and vice versa.

Sixth, to provide an improved power means for clutch control.

Seventh, to provide an improved power means for brake control.

Objects pertaining to details and economies of construction and operation will appear from the description to follow. The invention is defined in the claims. A structure embodying the features of my invention is illustrated in the accompanying drawings, in which:

The parts will be identified by their numerals of reference which are the same in all the views.

1 is the floor of the automobile, 2 the foot board, 3 the dash, 4 a shelf on the front of the dash, and 5 a supporting bracket. 6 is the pedal shaft preferably carried by a pair of brackets 7 secured by any suitable means, not shown, to the chassis frame. 8 is the clutch operating shaft supported in the clutch housing, not here shown. The clutch shaft is provided with an arm 9 for actuation of the same.

10 is the clutch lever and foot pedal provided with hub 101 supported to rock on the shaft 6, and provided with a specially-constructed arm 102 hereafter to be described.

11 is the brake lever provided with a pedal and supported by hub 111 on the said shaft 6, and provided with a specially constructed arm 112 hereafter to be described.

12 is the power lever carried by hub 121 on the shaft 6 and provided with the brake and power control arm 122 and the clutch arm 123 detachably engaged with the shiftable clutch link, hereafter to be described.

13 is the power cylinder, here operated by vacuum, supported on the shelf 4 on the front side of the dash board 3 and retained in place by the bracket 5 embracing the top.

14 is a piston adapted to reciprocate within the said cylinder. 15 is the piston rod rigidly connected to the piston and adapted to traverse, and oscillate to some extent, in the specially constructed stuffing box 16 later to be described in detail. The piston rod 15 is connected to the power arm 12 and is the means for actuating the said power arm and its connected lever arms and devices.

17 is the engine valve case, the valve being of the piston type. 18 is the valve piston.

19 is the supply pipe connected to the intake manifold and the top of the casing 17 and provides the connection for the vacuum operation of said power cylinder from the manifold.

20 is the breather pipe connected to the crank case of the engine for controlling air to and from said engine valve and to and from the power cylinder.

21 is the connection from said engine valve to the upper cylinder head to permit intake and discharge of air and the control of the dash pot or cushion.

Figures 1, 3, 3A:
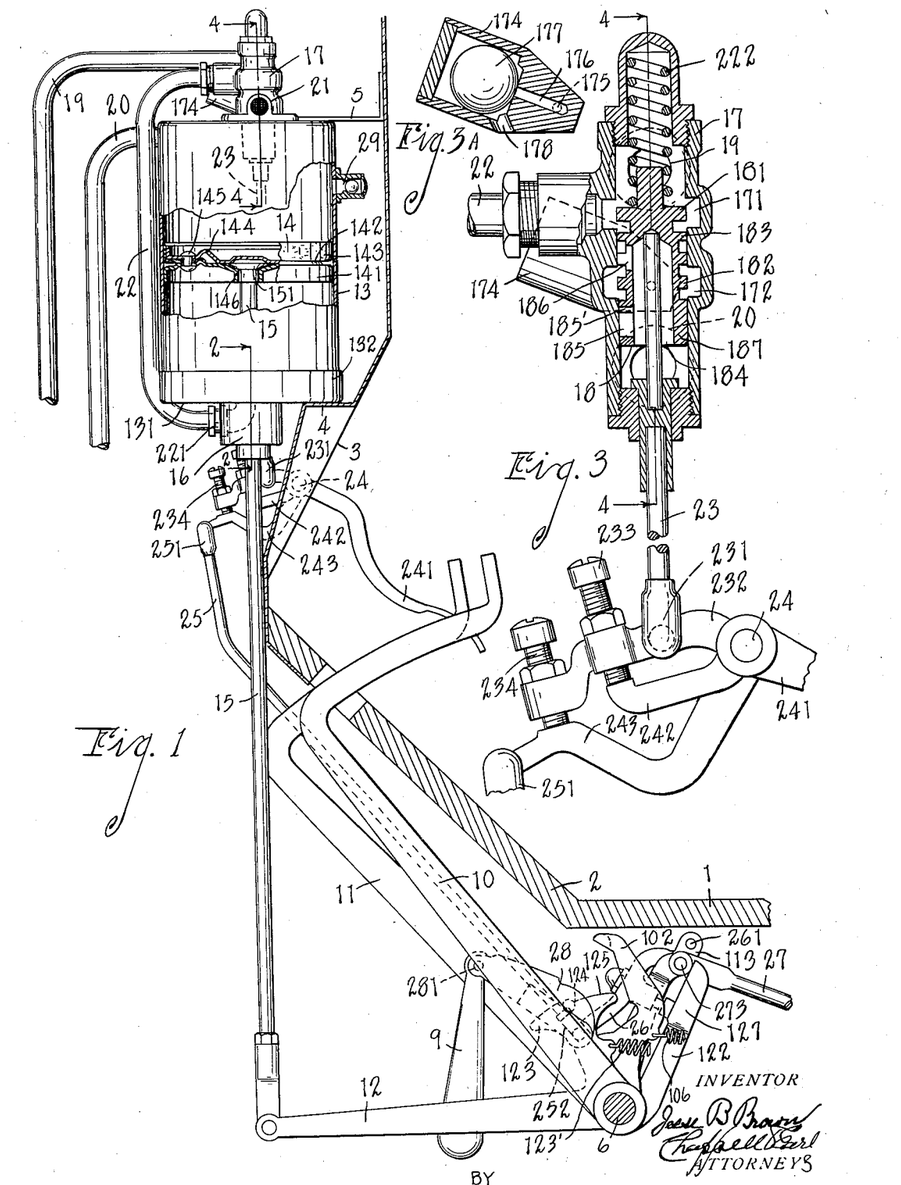
Fig. 1 is a detail side elevation view of a structure embodying the invention, the cylinder being shown in partial section, and the position of the parts being substantially at the neutral, that is, at a point where the structure is inactive, but at the starting point of the application of the brakes. The floor and foot boards and dash board of the automobile are shown in conventional form, the steering column, emergency brakes and other details being omitted as not being necessary to an understanding of my invention, the connections to the engine manifold and crank case being also omitted.
Fig. 3 is an enlarged detail sectional view on line 3—3 of Figs. 2 and 4, showing details of the engine valve and its connecting arm in the initial position with the engine dead.
Fig. 3A is a detail vertical section of the check valve control of the dashpot outlet taken on line 3a—3a of Fig. 2.
Figure 2:
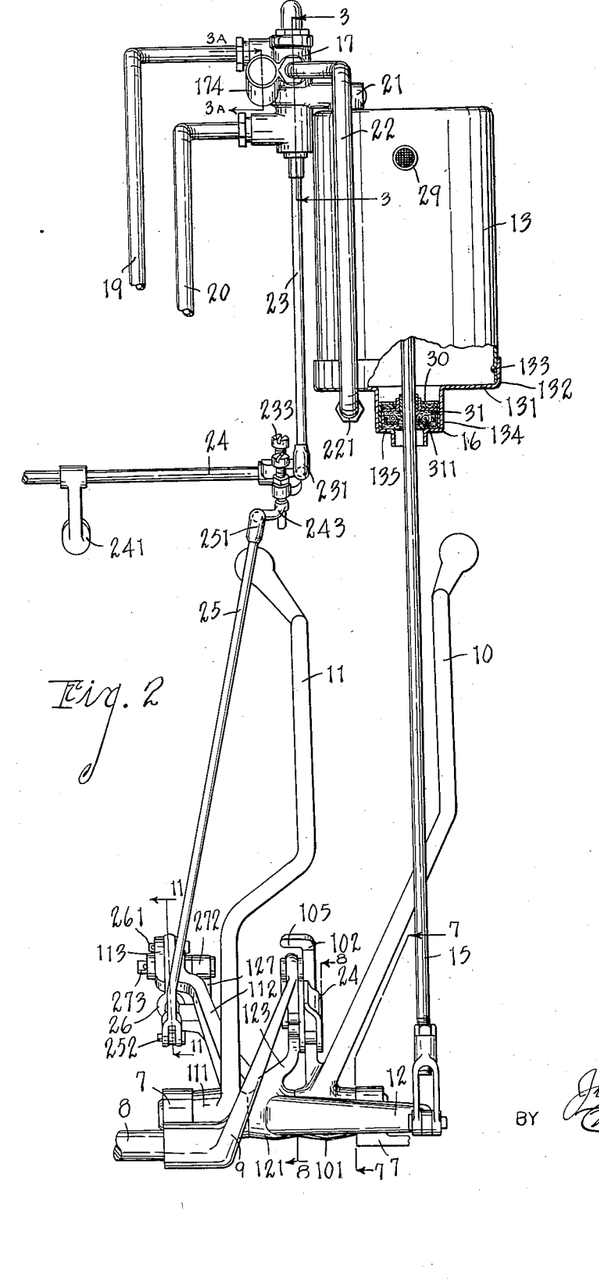
Fig. 2 is a front elevation of my improved mechanism taken from the left-hand side of Fig. 1, all parts of the automobile being omitted, and the connection to the manifold and crank case also being omitted and the supports for the accelerator shafts and other parts being omitted, part of the cylinder being broken away and in section on line 2—2 of Fig. 1 to show the stuffing box.

22 is the pipe connection extending from the valve and connecting by fitting 221 to the under or bottom head of the cylinder to draw the vacuum to actuate the engine cylinder and to permit inlet of air when the vacuum is broken. 222 is the valve spring tending to force the valve down to its bottom position seen in Fig. 3.

23 is the valve stem. This is connected by a universal joint 231 to the rocker lever 232.

24 is the accelerator shaft operated by accelerator pedal 241. Rocker 232 is pivoted on the accelerator shaft 24. Arm 242 is fixed on the accelerator shaft 24 and its outer end reacts upon the adjustable stop 233 on the rocker 232. The outer end of the arm 232 is provided with adjustable stop 234. The stops 233 and 234 are set screws with lock nuts of usual construction. 243 is the control arm for the valve pivoted on the shaft 24 provided with a universal joint 251 at its outer end.

25 is the thrust bar or control pitman connected by universal joint 251 to the outer end of the arm 243 at its upper end and by yoke pivot joint 252 at its lower end to the pivoted intermediate actuating lever 26 carried on the brake lever arm. The control pitman 25 is connected to support the pivoted arm 243 to act as a variable stop for control hereafter to be described in detail. It also cooperates with the said arm to serve as the actuating means for the valve to control the said cylinder and thereby controls the power lever and thereby the brake and clutch.

26 is an intermediate actuating lever which is pivoted on pin 261 which serves as a fulcrum and also as a power connection at different stages of operation. Lever 26 is disposed between the bifurcations 113 on the brake lever arm 112. Through said bifurcations is formed an enlarged hole 114 for a purpose hereafter to be explained. The lower front side of the intermediate lever 26 is provided with a yielding plunger 262 which is disposed in the socket 263 and is held yieldingly outward by spring 264 reacting against the collar 265 on said plunger 262. This plunger also does double duty.

Figures 11, 12, 13, 14, 15, 22:
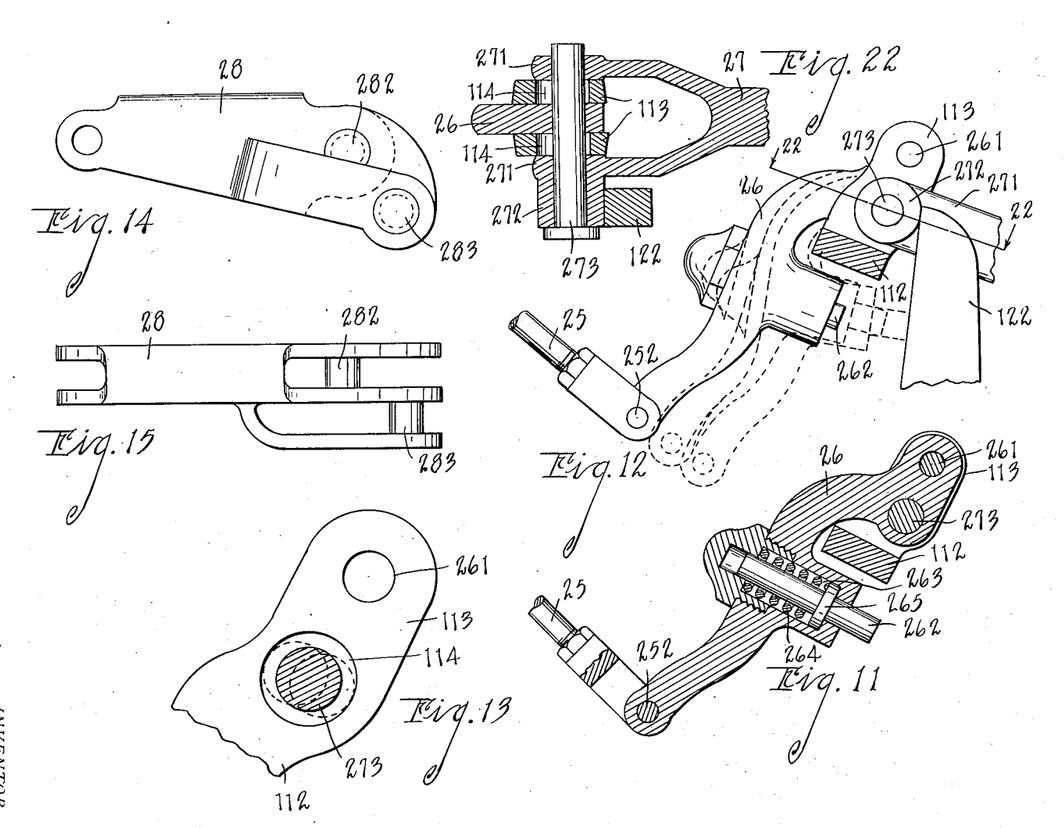
Fig. 11 is an enlarged detail sectional view on line 11—11 of Fig. 2 through the intermediate actuating lever for said engine valve control connection carried by the said brake arm and the brake rod connection.
Fig. 12 is a detail view of the structure appearing in Fig. 11, showing it in three operating positions.
Fig. 13 is an enlarged detail of the upper end of the brake lever arm with its pivot and the cross pin of the brake rod shown in cross section, indicating the relative positions of the parts during the various operations and movements, and showing the relation of the brake rod pin to the enlarged hole near the upper end of the said brake lever arm.
Fig. 14 is a detail side elevation view of the shiftable connecting link for the clutch mechanism.
Fig. 15 is a plan view of the said shiftable link.
Fig. 22 is a detail sectional view taken on line 22—22 of Figs. 12 and 21 showing the brake rod and its connection as seen in Fig. 21, showing the laterally-projecting actuating lug or boss.
Figure 16:
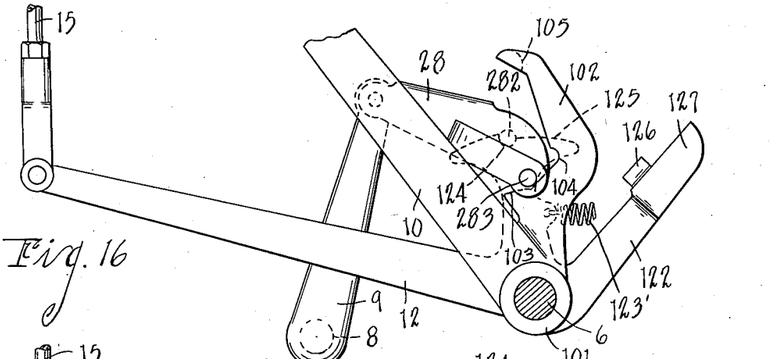
Figs. 16, 17, 18 and 19 are enlarged detail sectional elevation views of the operating levers comparable to the elevation view appearing in Fig. 1, showing different positions and relations of the shifting means for the power clutch means, and showing the different positions thereof at different stages of operation.

27 is the brake rod, shown in plan in Fig. 22 and seen in elevation in Fig. 1. This is provided with bifurcations 271 which embrace the bifurcated ends 113 of arm 112, one of which bifurcations 271 carries the actuating boss 272. Through the bifurcations is disposed the cross pin 273 which pivotally unites the said brake rod to arm 26. The pin 273 is disposed through the enlarged hole 114 and is of lesser diameter than said hole, for the purpose to be hereafter explained in considering the operation of the device. Owing to this variation in size, three general positions of the intermediate lever 26 are essential, as will be seen by the dotted line indication in Fig. 12. The relation of the pin 273 to the enlarged hole 114 is seen in Fig. 13. It will be seen from this description that the relation of the brake rod to the lever arm 112 is varied during the operation of the device, the purpose of which variation will appear from the description to follow.

Figure 17:
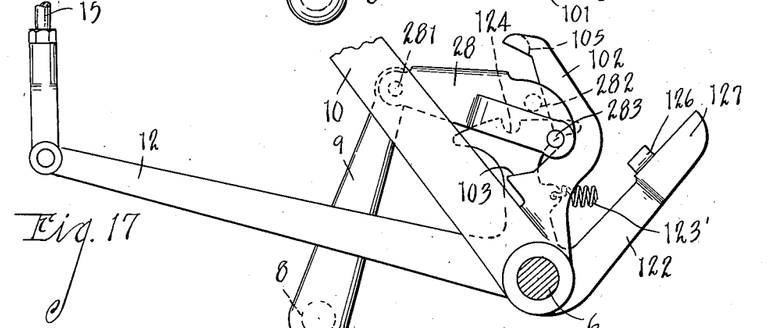

28 is the shiftable clutch link which is pivoted at 281 to the clutch shift arm 9. 282 is the power cross pin on the shiftable link 28 and is shown in engagement with the power operating arm 123 which is operated by the power lever arm 12, the engagement being indicated particularly in Figs. 1, 2, 8, 16, and 19–21. 283 is the clutch pedal cross pin on the said shiftable link 28 for engagement with the clutch pedal lever arm 102 when the clutch is being operated by the pedal and not by power, as seen in Fig. 17. When the engine is stopped, the levers assume practically the position indicated in Fig. 16 when the engine has been operating and actuating the clutch by power. When in this position, if it is desired to shift from power operation to foot or pedal operation, the operator presses the clutch pedal forward, the arm 102 acts by cam surface 103 upon the pedal cross pin 283 and cams the pin upwardly into the rounded notch 104 on the lever arm 102. This raises the power cross pin 282 out of the notch 124, disengaging the power arm 123 and engaging the arm 102 for pedal operation. The power arm 123 is provided with laterally-projecting guides and cam surfaces 125 and with pivot notch 124 to receive the power cross pin 282 of the said shiftable clutch link 28.

Figure 18:
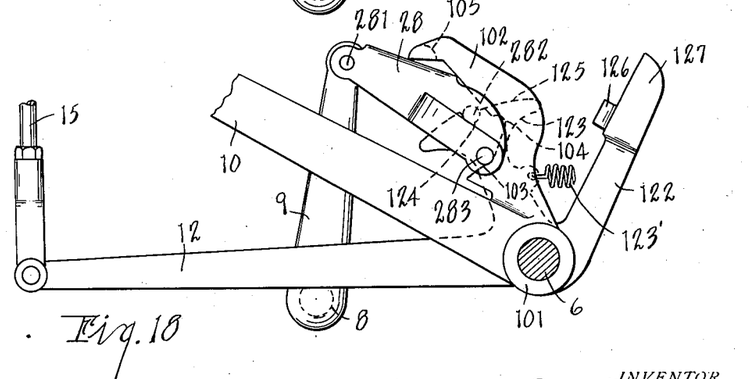
Figure 19:
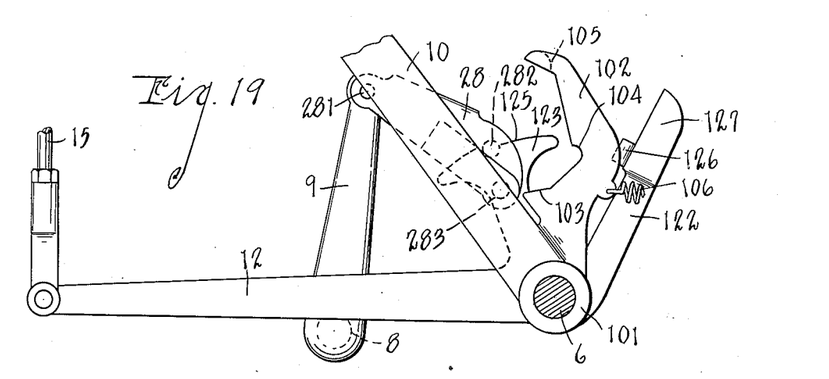
Figure 20:
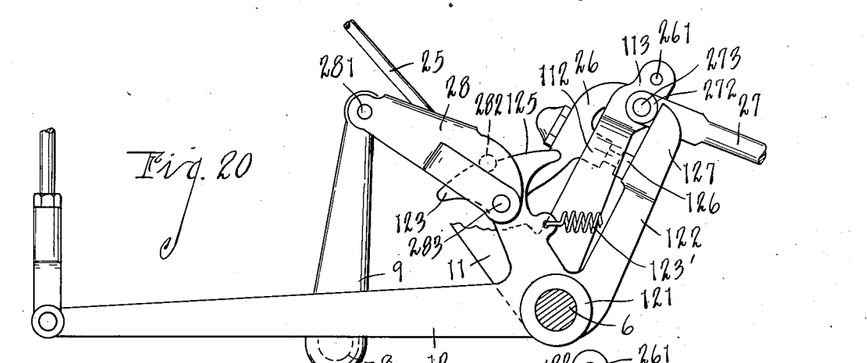
Figs. 20 and 21 are enlarged detail sectional elevation views similar to Fig. 8 of the brake parts, showing the different positions thereof in different stages of operation.
Figure 21:
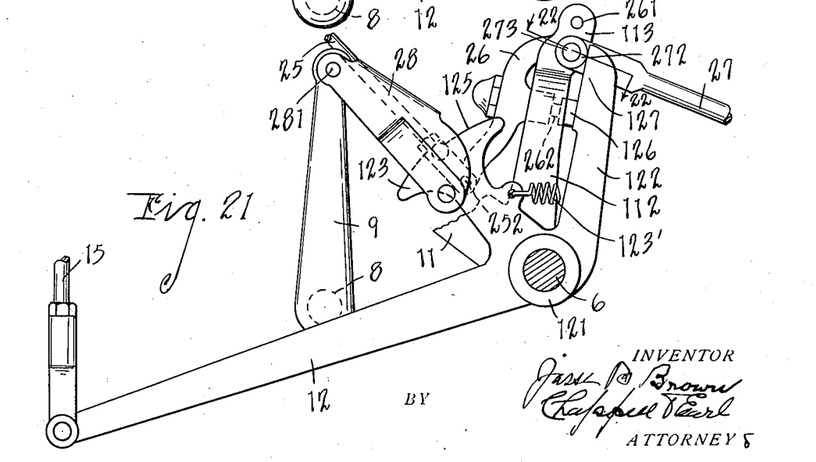

The position of the parts when they are pedal driven is shown in Fig. 17. When it is desired to shift the shiftable link 28 from the pedal arm 102 to the power arm 123, it is necessary to have the engine running. This is necessary to cause the piston 14 to take the central neutral position which is substantially seen in Fig. 1 and the parts to assume precisely the position indicated in Fig. 18. When this is done, the clutch pedal is pushed forward and down to the limit as far as it will go, and this swings arm 102 (see Fig. 18) into action against the top side of the link 28. The arm 102 is provided with the laterally-projecting finger 105 which engages on top of the shiftable link, as seen in Fig. 18, and forces it down, causing the power pin 282 to cam the lever arm 123 and snap into the notch 124, thus completing the power connection to the clutch arm 9. The clutch pedal is then released and swings back by action of its spring 106 (see Fig. 7) to the position indicated in Figs. 1 and 19, and the power actuation is thus established until the shiftable link 28 is again shifted by the deliberate action of the operator to the connection for pedal operation as above described. The arm is returned to normal position by the spring 123' connected thereto (see Figs. 1, 8, 20 and 21).

The valve casing 17 is connected at its upper end to the vacuum connection 19 as specified. The casing 17 is provided with an annular chamber 171 and the valve is provided with an annular land 181, being an annular head that passes into the bore of the valve chamber to control the passage to the chamber 171. This controls the action of the vacuum to and from the bottom of the cylinder, the connection 22 (see Figs. 1 and 3) being provided to the annular chamber 171 for that purpose. The valve casing 17 is also provided with an annular chamber 172 and the valve with cooperating annular land 182 which controls the flow to and from the top of the cylinder through connection 21 which is done concurrently with the control of the vacuum. The annular land 183 of the valve cooperates to control the relief of the power cylinder and its connection with the breather pipe 20, the detail of which control will be later pointed out.

The valve 18 is made hollow at 184 with skirting 187 at the bottom with lateral perforation 185 and an upwardly projecting notch 185'. This controls the discharge from the top of the cylinder when the vacuum is released and controls the air flow from the cylinder and thoroughly cushions the same and prevents the clutch spring slamming the clutch into engagement. A check valve 29 is provided to permit the free escape of air from the cylinder until the piston passes the same, when the cushioning effect occurs. The cushion is controlled by the valve port 185 and the speed of the clutch seating is regulated by the extent to which the port 185 is uncovered. If merely the projecting notch 185' is uncovered, the release of the cushion will be slow.

Figure 5:
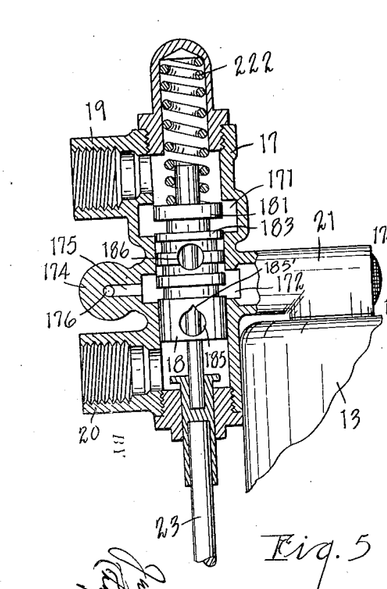
Fig. 5 is a similar vertical sectional view of the valve in neutral position, being the position that the valve assumes after the engine starts, the valve being positioned to control the vacuum to about two or three pounds to the square inch which holds the piston in central position with the clutch out. This is also the holding position when the brake is partially applied.

Cross holes 186 are in the hollow valve to permit, when the clutch is allowed to seat, the connection and delivery of air from the breather 20 through the annular chamber 171 and its connection to the bottom of the cylinder. The land 183 is then advanced above the annular chamber 171, as seen in Fig. 5, and the vacuum is entirely cut off and the bottom of the cylinder is free of either vacuum or compression action. At the same time the round port 185 is fully open to annular chamber 172 the top of the cylinder is likewise connected to the breather and is entirely free.

A check valve control for the dashpot is formed with its casing integral with the valve 17. This comprises the valve casing 174, cylindrical in form, which is connected by a port 175, 176 to the annular port 172. 177 is the valve ball which is in the cylindrical casing which is inclined upwardly and forwardly and seats against the end of the port 176. 178 is the vent. This valve chamber being inclined, the ball valve 177 rests by gravity against the port 176. It ordinarily maintains a minimum pressure in the dashpot of the cylinder, or that part of the engine cylinder which is acting as a dashpot. If the pressure becomes too high the ball 177 is lifted. Owing to its comparatively close fit it is cushioned so that it does not slam and air escapes at the vent 178.

When the valve 18 is moved to connect port 185 with the port 172, it, of course, relieves the work to some extent on this check valve control. The result is that this check valve control makes the action of the dashpot and the whole machine smooth and evenly cushioned.

Because the check valve casing is disposed so that it is inclined upwardly and forwardly, its action permits the motor to make a smooth clutch engagement. This is due to the fact that the inertia of the ball increases the mere action of gravity in that behalf.

From this description, the movements of the valve and the purpose of it will be clearly understood.

When it is desired to apply the brake, the actuating rod 23 is pushed up to such an extent that the valve 18 is raised so that air is exhausted from the bottom of the cylinder and tends to pull the piston from the neutral position down to the position required for the application of the brake. The extreme limit, of course, is the bottom of the cylinder. If this is open wide, the brake is applied to the fullest extent and it is applied to the extent to which the valve is opened and the air exhausted. The valve 18 is held down by the spring 222 and rod 23 is indirectly connected to lift valve 18 when pushed up.

It will thus be seen that it is important to accurately control the amount of vacuum for the seating of the brake and also for the release of the clutch. It has been pointed out that for the release of the clutch, stop 234 on arm 232 cooperates with the corresponding part of the lever 243 which is moved upwardly by the power brake arm 122 and connections by the operation of the mechanism to the required point for stopping the piston at neutral position or at any intermediate braking point. This is done by the power arm 122 cooperating with the brake arm 112. The power arm 122 is provided with a lateral finger 126 which cooperates with the plunger pin 262 and a finger 127 at the end of the lever arm 122 engages lug 272 carried by the brake rod 27, and these cooperate with the pivoted intermediate lever 26. When it is desired to apply the power brake, the brake pedal 11 is pushed. This is done only when the engine is running. The brake pedal 11 and brake arm 112 are depressed, swinging the said arm 112 upwardly and forwardly, which tends to pull the brake rod 27. This reacts to compress the plunger 262 against the finger 126, thereby pulling down the control rod 25, depressing the arm 243. This allows the arm 232 to follow the same, opening the valve 18 towards the position indicated in Fig. 4, the extent of the opening being controlled by the amount of depression of the brake pedal 11.

When the air is exhausted from the bottom of the cylinder 13, it pulls down the piston 14, reacting through piston rod 15 on the power arm 12, and swings the arm 122 into engagement with the lug 272 on the brake rod yoke, and finger 126 reacts with the plunger 262 and checks the action of the valve at the point to which the said brake pedal has been depressed. A further depression of the brake pedal causes further action and further power to be exerted upon the brake, and in this way the brake is completely under the control of the operator, being applied to the extent to which he depresses the brake pedal 11. The action is very prompt. It is cushioned and regulated in such a manner as to avoid any grabbing of the brakes.

Figure 6:
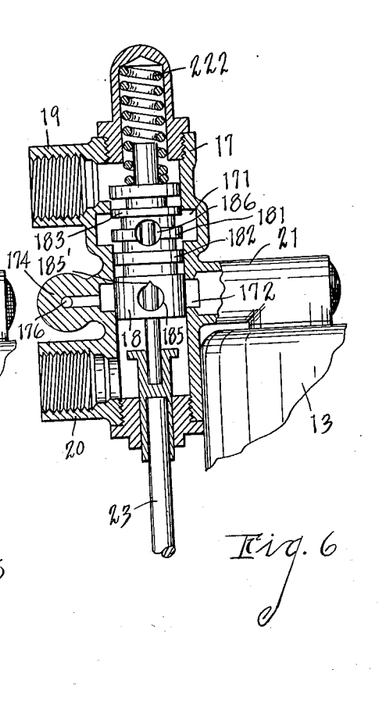
Fig. 6 shows the valve in the driving position or the position which the valve assumes on the depression of the accelerator which shuts off the vacuum, releases the piston, and lets in the clutch.
Figures 7, 8, 9, 10:
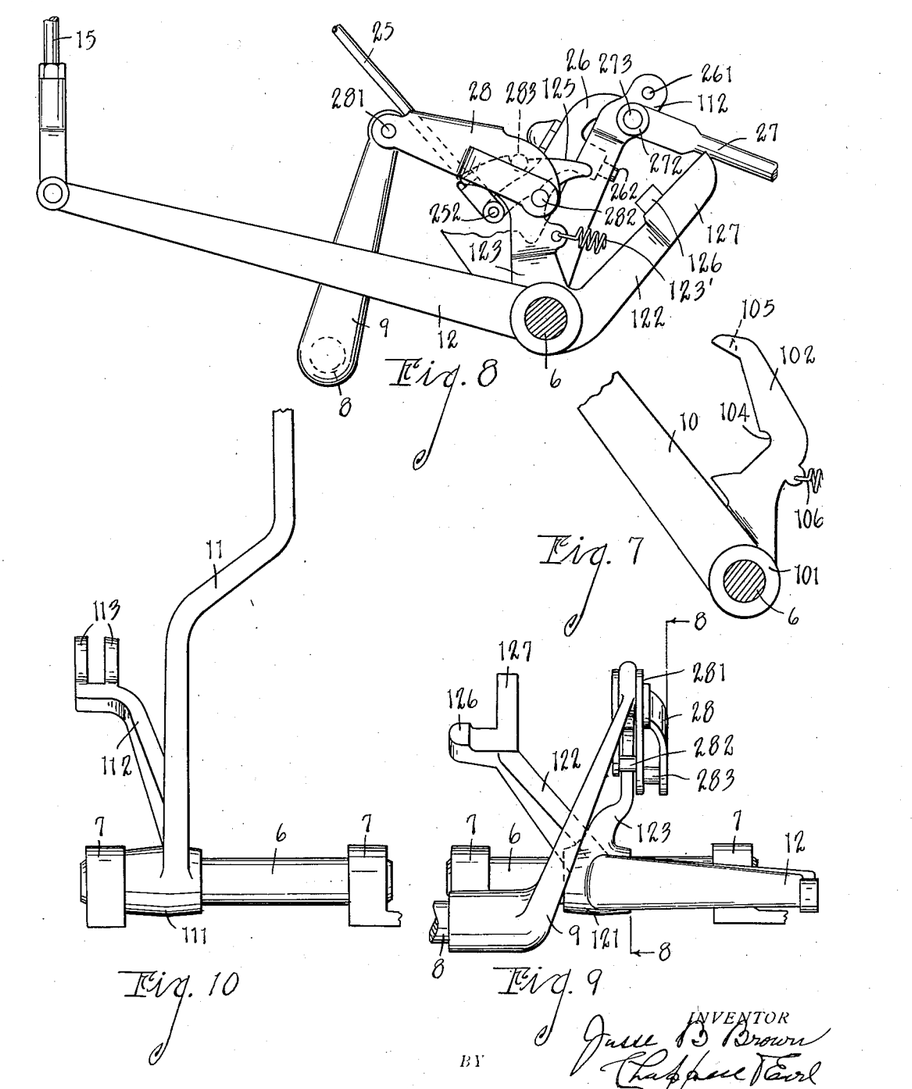
Fig. 7 is a detail elevational view of the clutch lever and pedal and arm, partially broken away, it being in effect taken on the sectional line 7—7 of Fig. 2.
Fig. 8 is a detail elevational view on line 8—8 of Figs. 2 and 9, showing the power operated lever and lever arms and incidentally the associated brake lever and link connection to the clutch control shaft arm.
Fig. 9 is an elevation view of the power lever, lever arms, and support, and shiftable link connection, similar to that appearing in Fig. 2 with the other parts omitted so that details of the said power lever and lever arms appear.
Fig. 10 is an elevation view similar to Figs. 2 and 9 showing the brake lever and its arm on the pedal shaft, all the other parts being omitted.

On releasing the pressure on the brake pedal, the spring 264 reacts on the plunger 262, forcing the lever 26 (see Fig. 12) forward. This pushes the actuating rod 25 and forces the lever 243 to the right height to position the valve as indicated in Fig. 6. This permits entry of air from the breather into the bottom of the cylinder. The air at the upper part of the cylinder is discharged through the check valve 29. The brake retracting springs reacting on rod 27 swing the power lever 12 upwardly to the central or neutral position, at which point the brakes are fully released, and the rod 25 is then forced down by the stop 234 and the valve assumes the neutral position shown in Fig. 5.

The operation of this structure is substantially instantaneous, but it is a long story to describe, so that the combination relation of the various parts fully appears.

Figure 4:
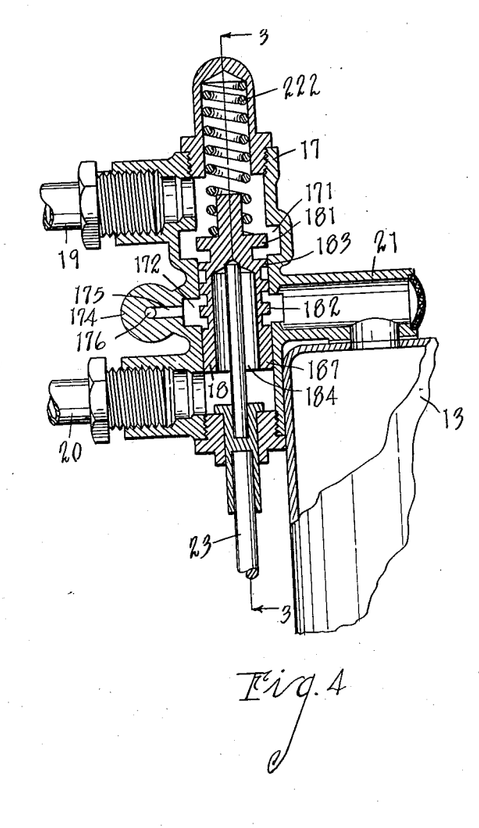
Fig. 4 is an enlarged vertical section taken on line 4—4 of Figs. 1 and 3 through the engine controlling valve, showing the valve in initial position for applying the brake when the engine is running. It is the position also seen in Fig. 3 when the engine is dead.

When the engine is not running and the whole structure is at rest, the valve structure is in the position indicated in Fig. 4 and the piston in the power cylinder will be pushed to the top of the cylinder due to the action of the clutch spring which holds the clutch in gear. When the engine is started a vacuum is created in the lower end of the cylinder which draws the piston down to the central neutral position where it stops. This is accomplished by the action of the piston rod on the power lever 12 which swings arm 122 upwardly so that the finger 126 strikes plunger 262 of the intermediate operating lever 26, which reacts upon the control rod 25, which through its universal joint connection 251 actuates the arm 242, swinging it against stop 234 on the arm 232, which operates control rod 23 and raises the valve 18 to the position indicated in Fig. 5. This controls the vacuum to the extent that it will pull two or three pounds to the square inch, which is sufficient to hold the piston down to the central neutral position with the clutch disengaged and the driving power completely disconnected when the engine is idling.

To start the car, the driver steps on the accelerator, a very slight movement cuts off the vacuum, and the clutch spring reacts to swing the power connection and force the piston toward the top where it runs very freely until it passes the check valve 29. The piston is then cushioned and the speed in seating of the piston is controlled by the elevation of valve piston 18 and the extent of uncovering of the port 185. If the tip or notch 185′ only is uncovered, the cushion will be relieved slowly and the clutch will seat slowly. Thus the clutch is completely controlled by the extent of pressure on the accelerator pedal. By releasing the pressure on the accelerator pedal, the clutch is thrown out, the power is disconnected, and the automobile allowed to coast. This is free wheeling on the road. If it is desired to stop, the brake pedal 11 is then depressed. This swings the brake arm 112 upwardly and forwardly which tends to pull the brake rod 27 and react on the intermediate lever 26, directly fulcrums the same on plunger 262, pulls down rod 25 causing the valve to drop and permits the suction to pull down the brake to the extent of the brake pedal operation.

The piston 14 is provided with a skirting 141 that serves as a guide, which is offset at 142 to form an annular space or peripheral recess for the accommodation of the cupped packing. A leather cup packing 143 (flesh side out preferably) is made use of, having a forwardly projecting flange fitting snugly within the cylinder. This is retained in place on the head by the plate 144 secured thereto by suitable rivets 145. An annular flange 146 is cupped on the front of the piston. The piston rod 15 is provided with a head 151 having a thin flange engaged rigidly between these plates, the piston rod 15 being riveted down on these parts. The annular space for the cupped packing permits great freedom of action without undue friction due to heavy pressure. The fit is air tight. The action on the piston opens up the cup by action over the shoulder under pressure and at the same time on reverse frees the piston completely.

The head 131 of the cylinder is provided with a cupped flange 132 which is provided with struck-up projections 133 and sealed in position by suitable cement.

The stuffing box is in the form of a cup 134, flanged inwardly at 135. Within this is a gland structure comprising an outer shell 30 with an annular chamber opening inwardly toward the said piston rod. On the piston rod is a sliding head 31 of lesser diameter than the said chamber, embraced by the same at top and bottom and adapted to reciprocate and slide laterally in all directions to accommodate the action of the piston rod which is slightly flexible, the deflection being to accommodate the movements of the power arm 12. The inner head is provided with packing material retained tightly in position by the coiled spring 311, this gland being of well known construction and especially adapted to this use and not being subject of a patent claim herein.

Having thus described my invention, what I claim as new and desire to secure by Letters Patent is:

1. The combination of an automobile having a gasoline driving engine, brake, clutch having a control arm, and accelerator shaft and pedals, of a pedal shaft, a clutch pedal lever and clutch actuating arm supported on said shaft, a power lever having an arm corresponding to said clutch pedal arm, a power cylinder having a piston carried by the said automobile and connected to operate the power lever, a shiftable connecting link pivoted to the clutch control arm having disconnectible cross pins one of which is in the plane of the power clutch arm and adapted to engage the same and the other being a pedal cross pin and disposed to cooperate with the clutch pedal arm, whereby a simple manipulation of the pedals changes the clutch from pedal control to power control or vice versa.

2. The combination in an automobile structure of a power operating means comprising a clutch actuating arm, a clutch having a control arm, a clutch pedal comprising an actuating arm, and a shiftable link connection to connect either the power arm or the pedal arm to said clutch arm.

3. The combination of an automobile having a gasoline driving engine, a brake having a brake rod, a clutch, an accelerator and pedals therefor, of a power lever having a clutch actuating arm and a brake actuating arm, a shiftable link connection for the said clutch to connect either the clutch pedal or power arm, means for shifting the said link, a power cylinder having a piston and piston rod connected to operate said power lever, the action at one end of the cylinder being to control the clutch and further action being to control the brake, an engine valve having a casing and a slide valve and having a connection from the intake manifold of the said engine to one end of said cylinder for the application of vacuum, a connection to the opposite end of said cylinder for the intake and discharge of air, a valve actuating lever to control the said engine valve, an arm controlled by said accelerator pedal to act on said valve actuating lever to control the engine valve to stop the piston at a predetermined point to release the clutch and further to actuate the valve to control the piston to engage the clutch when the accelerator pedal is depressed.

4. The combination of an automobile having a gasoline driving engine, a brake having a brake rod, a clutch, an accelerator and pedals therefor, of a power lever having a clutch actuating arm and a brake actuating arm, a power cylinder having a piston and piston rod connected to operate said power lever, the action at one end of the cylinder being to control the clutch and further action being to control the brake, an engine valve having a casing and a slide valve and having a connection from the intake manifold of the said engine to one end of said cylinder for the application of vacuum, a connection to the opposite end of said cylinder for the intake and discharge of air, a valve actuating lever to control the said engine valve, and an arm controlled by said accelerator pedal to act on said valve actuating lever to control the engine valve to stop the piston at a predetermined point to release the clutch and further to actuate the valve to control the piston to engage the clutch when the accelerator pedal is depressed.

5. The combination of an automobile having a gasoline driving engine, a brake having a brake rod, a clutch, an accelerator and pedals therefor, of a power lever having a clutch actuating arm and a brake actuating arm, a shiftable link connection for the said clutch to connect either the clutch pedal or power arm, means for shifting the said link, cylinder piston engine means to control said power lever, valve means for said engine having a stop associated with the accelerator pedal to hold the clutch in released position, and permit the same to engage on the actuation of said accelerator pedal, an additional control arm acting on the valve means of the said engine structure to control the engine to hold the power lever in predetermined position to regulate the application of the brake, an intermediate valve lever connected to actuate the valve and having a yielding part carried by the brake pedal lever, and stops on the brake power lever arm actuated by the power lever to coact with the said intermediate valve lever and the brake rod to apply the power of said engine and control the same or apply the brake by pedal action.

6. The combination of an automobile having a gasoline driving engine, a brake having a brake rod, a clutch, an accelerator and pedals therefor, of a power lever having a clutch actuating arm and a brake actuating arm, a shiftable link connection for the said clutch to connect either the clutch pedal or power arm, means for shifting the said link, cylinder piston engine means to control said power lever, valve means for said engine having a stop associated with the accelerator pedal to hold the clutch in released position, and permit the same to engage on the actuation of said accelerator pedal, an additional control arm acting on the valve means of the said engine structure to control the engine to hold the power lever in predetermined position to regulate the application of the brake, an intermediate valve lever connected to actuate the valve carried by the brake pedal lever, and stops on the brake power lever arm actuated by the power lever to coact with the said intermediate valve lever and the brake rod to apply the power of said engine and control the same or apply the brake by pedal action.

7. The combination of an automobile having a gasoline driving engine, a brake having a brake rod, a clutch, an accelerator and pedals therefor, of a power lever having a clutch actuating arm and a brake actuating arm, cylinder piston engine means to control said power lever, valve means for said engine having a stop associated with the accelerator pedal to hold the clutch in released position, and permit the same to engage on the actuation of said accelerator pedal, an additional control arm acting on the valve means of the said engine structure to control the engine to hold the power lever in predetermined position to regulate the application of the brake, an intermediate valve lever connected to actuate the valve carried by the brake pedal lever, and stops on the brake power lever arm actuated by the power lever to coact with the said intermediate valve lever and the brake rod to apply the power of said engine and control the same or apply the brake by pedal action.

8. The combination of an automobile having a gasoline driving engine, a brake having a brake rod, a clutch, an accelerator and pedals therefor, of a power lever having a clutch actuating arm and a brake actuating arm, a power cylinder having a piston and piston rod connected to operate said power lever, the action at one end of the cylinder being to control the clutch and further action being to control the brake, an engine valve having a casing and a slide valve and having a connection from the intake manifold of the said engine to one end of the cylinder for the application of vacuum, a connection to the opposite end of the cylinder for intake and discharge of air, an arm associated with the brake for actuating the said valve to control the piston at a predetermined point to regulate the application of the brake by said power, an intermediate valve lever connected to actuate the said valve and having a yielding part being carried by the brake pedal lever, and stops on the brake power lever arm of the power lever to coact with the said intermediate valve lever and the brake rod to apply the power to said cylinder and control the same or apply the brake by pedal action.

9. The combination of an automobile having a gasoline driving engine, a brake having a brake rod, a clutch, an accelerator and pedals therefor, of a power lever having a clutch actuating arm and a brake actuating arm, cylinder piston engine means to control said power lever, valve means for said engine having a stop associated with the accelerator pedal to hold the clutch in released position and permit the same to engage on the actuation of the said accelerator pedal, an arm associated with the brake for actuating the said valve to control the piston at a predetermined point to regulate the application of the brake by said power, an intermediate valve lever connected to actuate the said valve and having a yielding part being carried by the brake pedal lever, and stops on the brake power lever arm of the power lever to coact with the said intermediate valve lever and the brake rod to apply the power to said cylinder and control the same, or apply the brake by pedal action.

10. The combination of an automobile having a gasoline driving engine, a brake having a brake rod, a clutch, an accelerator and pedals therefor, of a power lever having a clutch actuating arm and a brake actuating arm, a shiftable link connection for the said clutch to connect either the clutch pedal or power arm, means for shifting the said link, a power cylinder having a piston and piston rod connected to operate said power lever, the action at one end of the cylinder being to control the clutch and further action being to control the brake.

11. In a structure of the class described, a power cylinder, a piston therein having a head having an annular peripheral recess at the packing side thereof, a cup leather packing pointing towards the head of said cylinder and adapted to move relatively into the said recess to permit the maintenance of the closure of said packing with said cylinder, a piston rod rigidly secured to said piston head, and a stuffing box having a laterally movable member embracing the said piston rod.

12. In a structure of the class described, a power cylinder, a piston therein having a head having an annular peripheral recess at the packing side thereof, a cup leather packing pointing towards the head of said cylinder and adapted to move relatively into the said recess to permit the maintenance of the closure of said packing with said cylinder, a piston rod secured to said piston head.

13. In a structure of the class described, a brake pedal having an arm for applying said brake, a brake rod having a cross pin engaging the said brake pedal arm with a loose joint to permit slight independent movement of the said brake rod and brake arm, a power lever having an arm adapted to engage and actuate the said brake rod, a power means to actuate said power lever, a power control lever pivotally supported on said pedal arm, and a yieldable plunger part adapted to contact with the brake power arm and yield under the pressure thereof independent of the movement of said pedal arm, whereby the actuation of said brake pedal arm operates the said control arm to apply the power, react upon the brake rod to advance the same in accordance with the advance of the said pedal arm, and permit actuation of said brake by the pedal should the power fail.

14. In a structure of the class described, a brake pedal having an arm for applying said brake, a brake rod having a cross pin engaging the said brake pedal arm with a loose joint to permit slight independent movement of the said brake rod and brake arm, a power lever having an arm adapted to engage and actuate the said brake rod, a power means to actuate said power lever, and a power control lever pivotally supported on the said pedal arm adapted to contact with the brake power arm and yield under the pressure thereof independent of the movement of said pedal arm, whereby the actuation of said brake pedal arm operates the said control arm to apply the power and react upon the brake rod to advance the same in accordance with the advance of the said pedal arm and permit actuation of said brake by the pedal should the power fail.

15. In a structure of the class described, a brake pedal having an arm for applying said brake, a brake rod having a cross pin engaging the said brake pedal arm with a loose joint to permit slight independent movement of the said brake rod and brake arm, a power lever having an arm adapted to engage and actuate the said brake rod, a power means to actuate said power lever, and a power control lever pivotally supported on the said pedal arm, and a yieldable plunger part adapted to contact with the brake power arm and yield under the pressure thereof independent of the movement of said pedal arm, whereby the actuation of said brake pedal arm operates the said control arm to apply the power and react upon the brake rod to advance the same in accordance with the advance of the said pedal arm.

16. In a structure of the class described, a brake pedal having an arm for applying said brake, a brake rod having a cross pin engaging the said brake pedal arm with a loose joint to permit slight independent movement of the said brake rod and brake arm, a power lever having an arm adapted to engage and actuate the said rod, a power means to actuate said power lever, a power control lever pivotally supported on the said pedal arm adapted to contact with the brake power arm and yield under the pressure thereof independent of the movement of said pedal arm, whereby the actuation of said brake pedal arm operates the said control arm to apply the power and react upon the brake rod to advance the same in accordance with the advance of the said pedal arm.

17. The combination of an automobile having a gasoline driving engine, a clutch, a power cylinder having a piston and piston rod connection to control the said clutch, the action of the piston at the end of the cylinder being to control the clutch by a dash-pot action, a discharge passage connecting to the end of the cylinder, a valve casing having a cylindrical bore inclining forwardly and upwardly, the valve ball adapted to rest against the opening of the said passage, and a vent opening to the valve casing whereby the ball rests by gravity aided by inertia to regulate and control the outlet from the cylinder.

18. A control means for a cylinder or dash-pot consisting of an inclined cylindrical valve casing having a cylindrical bore, and a ball valve therein adapted to rest by gravity to control the outlet.

JESSE B. BROWN.